June 22, 1948.　　　　L. E. DELOGHIA　　　　2,444,018
HYDRAULIC PULSATOR DRIVE MECHANISM
Filed Sept. 27, 1945
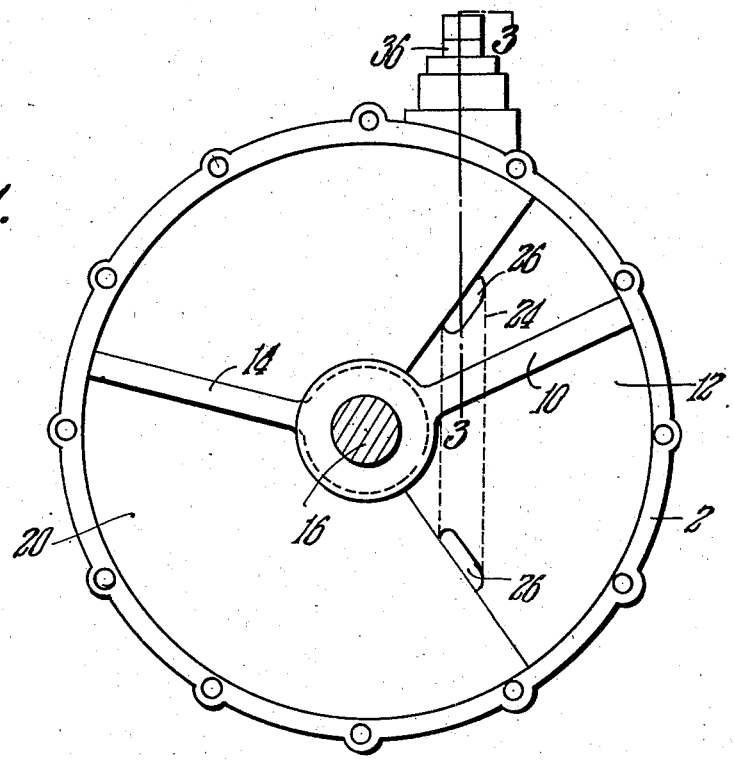
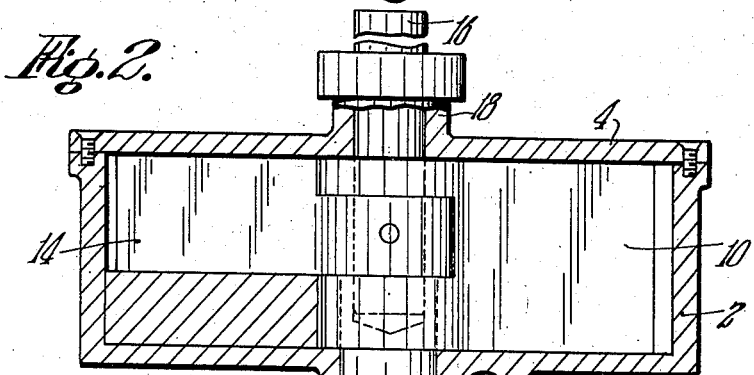
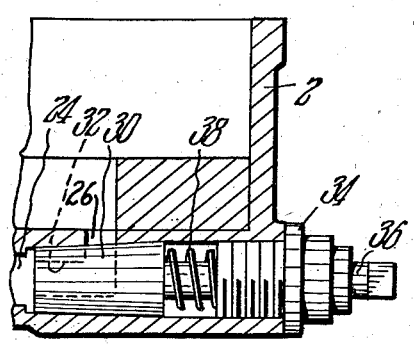
INVENTOR.
Louis E. Deloghia
BY Walter C. Ross
Attorney Patented June 22, 1948

2,444,018

UNITED STATES PATENT OFFICE 2,444,018

HYDRAULIC PULSATOR DRIVE MECHANISM

Louis E. Deloghia, Agawam, Mass., assignor to Perkins Machine and Gear Company, West Springfield, Mass., a corporation of Massachusetts Application September 27, 1945, Serial No. 618,877

5 Claims. (Cl. 60—54.5)

1

This invention relates to operating mechanism and is directed more particularly to mechanism for oscillating a shaft or the like back and forth.

The principal objects of the invention are directed to operating mechanism which is characterized by means for operating the shaft back and forth through various angles of oscillation. While the mechanism is particularly adapted for operating the oscillatable shaft or paddle of a washing machine, it is constructed and arranged for many and various other purposes.

The novel features of the invention in the form at present preferred will be more fully hereinafter referred to in connection with the accompanying description of the invention.

In the drawings:

Fig. 1 is a plan view of an operating mechanism embodying the novel features of the invention;

Fig. 2 is a transverse sectional elevational view through the mechanism shown in Fig. 1;

Fig. 3 is a sectional elevational view on the line 3—3 of Fig. 1.

Referring now to the drawings more in detail, the invention will be fully described.

A housing is represented by 2 to which a cover 4 is secured to provide a fluid-tight casing for the mechanism. A drive shaft 6 extends into the casing through a suitable stuffing box 8 and said drive shaft may be connected to any suitable source of power and by any means for oscillatory movements back and forth.

An impeller 10 is secured to the oscillatable drive shaft 6 by any suitable means and as the shaft 6 is oscillated back and forth the impeller 10 is oscillated back and forth in a chamber 12. A driven member 14 similar to the member 10 is fixed to a driven shaft 16 which extends through a suitable stuffing box 18. Said member 14 is adapted to oscillate back and forth through various angles in a chamber 20.

The chamber 20 as will be seen in Fig. 2 is of less depth than the chamber 12. The shaft 16 may be journalled in the shaft 6 if desired.

According to the invention, the impeller 10 is of relatively greater height than the paddle 14 and operates in chamber 12 which is of greater depth than the chamber 20. In this way the impeller has a greater effective area than the member 14.

Fluid, which may be oil or the like, is placed in the casing and as the impeller 10 is oscillated back and forth the fluid is forced into the chamber 20 to act on and oscillate the member 14.

The shaft 6 will be oscillated through a pre-determined angle so that the impeller 10 will move back and forth within its chamber and on each movement the member 14 will be acted upon by fluid within the chambers. By making the chamber 20 of less height than the chamber 10 and by making the impeller 10 of greater effective area than the member 14 the latter may have a greater angle of oscillation than the member 10. It is possible through a controlled passageway 24, which has openings 26 opposite its ends leading into chamber 12, to vary the angle of oscillation of member 14 by controlling the flow of fluid through the passageway. When the passageway 24 is entirely closed off so that the fluid is not forced therethrough by action of the impeller 10 then the fluid acts on the driven member 14 to obtain the maximum angle of oscillation. When the passageway 24 is fully open so that fluid is forced therethrough in opposite directions by the member 10 there is no action on the member 14. Hence, the angle of oscillation of the member 14 may be varied from zero to maximum depending upon the control of fluid through the passageway 24.

Various means may be employed for controlling the flow of fluid through passageway 24 but for illustrative purposes there is shown a tapered valve 30 which is rotatable in the lower side of the casing and has a passageway 32 therethrough as shown in Fig. 3. A threaded member 34 in engagement with the casing is provided through which a stem 36 of the valve extends and a spring 38 is disposed between the member 34 and valve 30 to hold it against its seat. By rotating the stem the valve member 30 may be positioned so as to position the opening 32 as may be desired with reference to the passageway 24. When the passageway 32 of valve 30 is in full register with opening 26 there is a free flow of fluid through passageway 24 between opposite sides of chamber 12 so that member 10 on oscillating forces fluid back and forth of the said passageway so that it does not act on paddle 14. As valve 30 is turned so as to close off or partially close off 26 the member 14 will be oscillated more or less according to the position of said valve. This valve 30 controls the flow of liquid through passageway 24 and thereby controls the angle of oscillations of member 14.

Hence, it is possible to obtain any desired angle of oscillation of the shaft 16 between zero oscillation and its maximum. This is desirable when the mechanism is used for driving various apparatus such as for instance the paddle of a washing machine in connection with which different materials require different degrees of agitation.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Driving mechanism comprising in combination, a casing having a chamber for an impeller and a chamber for a driven member connected thereto, an impeller in the first-named chamber and a driven member in the second-named chamber mounted for independent oscillatory movements, said casing provided with a passageway for fluid leading at opposite ends into opposite sides of the first-named chamber at opposite sides of said impeller, said impeller and driven member mounted for oscillation on a common axis, and a valve adjustable in said passageway adapted to vary the cross sectional area thereof and control the flow of fluid therethrough.

2. Driving mechanism comprising in combination, a casing having a chamber for an impeller and a chamber for a driven member connected thereto, an impeller in the first-named chamber and a driven member in the second-named chamber mounted for independent oscillatory movements, said casing provided with a passageway for fluid leading at opposite ends into opposite sides of the first-named chamber at opposite sides of said impeller and a valve adjustable in said passageway adapted to vary the cross sectional area thereof and control the flow of fluid therethrough, said second-named chamber being of relatively less height than the first-named chamber and the impeller having a relatively greater effective area than the driven member, and said impeller and driven members mounted for oscillation on a common axis.

3. Driving mechanism for oscillating the agitator shaft of a washing machine back and forth through various angles comprising in combination, a casing construction having a chamber for an impeller and a chamber for a driven member arranged whereby opposite ends of the chambers are connected together, an impeller in the first-named chamber and a driven member in the second-named chamber mounted on a common axis for independent oscillatory movements in their respective chambers, said casing provided with a passageway for fluid having ports at its opposite ends leading into opposite sides of said first-named chamber at opposite sides of said impeller, a valve provided with an opening therethrough mounted for adjustment in said passageway whereby the flow of fluid through the passageway may be controlled by said valve.

4. Driving mechanism for oscillating the agitator shaft of a washing machine back and forth through various angles comprising in combination, a casing construction having a chamber for an impeller and a chamber for a driven member with opposite ends of one chamber connected to opposite ends of the other chamber, an impeller and a driven member in said first-named and second-named chambers respectively and mounted on a common longitudinal axis for independent oscillatory movements in their respective chambers, the cross-sectional area of the first-named chamber on a plane passing through said chambers and through said longitudinal axis being relatively greater than that of said second-named chamber and the effective area of the impeller being relatively greater than that of the driven member, said casing construction provided with a passageway having opposite ends leading into said first-named chamber at opposite sides thereof and at opposite sides of said impeller, and a valve adjustable in said passageway adapted to vary the cross sectional area thereof and control the flow of fluid through said passageway.

5. Driving mechanism for oscillating the agitator shaft of a washing machine back and forth through various angles comprising in combination, a casing having a vertical cylindrical bore and a cover closing the upper end of said bore, a bottom wall at the lower end of said bore formed to cooperate therewith to provide a chamber for an impeller and a chamber for a driven member with the first-named chamber being of relatively greater depth than the second-named chamber and the opposite ends of one chamber connected to the opposite ends of the other chamber, an impeller and a driven member in said first-named and second-named chambers respectively mounted on a common vertical axis corresponding to the longitudinal axis of said bore for independent oscillatory movements in their respective chambers, said impeller and driven members extending radially outwardly from said common axis and longitudinally between said cover and the bottom wall of their respective chambers, said casing construction provided with a passageway having opposite ends leading into opposite sides of the first-named chamber at opposite sides of said impeller, and a valve adjustable in said passageway adapted to vary the cross sectional area thereof and control the flow of fluid therethrough.

LOUIS E. DELOGHIA.

REFERENCES CITED

The following references are of record in the file of this patent:

UNITED STATES PATENTS

| Number | Name | Date |
| --- | --- | --- |
| 560,934 | Robertson | May 26, 1896 |
| 662,515 | Yale | Nov. 27, 1900 |
| 692,879 | Lemp | Feb. 11, 1902 |
| 2,422,545 | Hanson | June 17, 1947 |

FOREIGN PATENTS

| Number | Country | Date |
| --- | --- | --- |
| 623,849 | Germany | Jan. 6, 1936 |